US012040148B2

(12) United States Patent
Testani

(10) Patent No.: US 12,040,148 B2
(45) Date of Patent: Jul. 16, 2024

(54) WI-FI OR WIRED THREE-WAY SWITCH

(71) Applicant: Pass & Seymour, Inc., Syracuse, NY (US)

(72) Inventor: Anthony M. Testani, Syracuse, NY (US)

(73) Assignee: Pass &Seymour, Inc., Syracuse, NY (US)

( * ) Notice: Subject to any disclaimer, the term of this patent is extended or adjusted under 35 U.S.C. 154(b) by 21 days.

(21) Appl. No.: 18/069,590

(22) Filed: Dec. 21, 2022

(65) Prior Publication Data

US 2023/0187153 A1 Jun. 15, 2023

Related U.S. Application Data

(63) Continuation of application No. 16/566,420, filed on Sep. 10, 2019, now Pat. No. 11,538,646.

(60) Provisional application No. 62/729,211, filed on Sep. 10, 2018.

(51) Int. Cl.
*H01H 47/02* (2006.01)

(52) U.S. Cl.
CPC .................................. *H01H 47/02* (2013.01)

(58) Field of Classification Search
CPC ..................................................... H01H 47/02
See application file for complete search history.

(56) References Cited

U.S. PATENT DOCUMENTS

| | | | | |
|---|---|---|---|---|
| 5,708,511 | A | 1/1998 | Gandhi et al. | |
| 5,748,094 | A * | 5/1998 | Neathway | H01H 9/161 315/129 |
| 7,687,940 | B2 * | 3/2010 | Mosebrook | H05B 39/08 307/115 |
| 7,872,377 | B2 * | 1/2011 | Wilson | H05B 47/185 307/114 |
| 9,018,803 | B1 * | 4/2015 | Elberbaum | H01H 9/00 307/113 |
| 10,219,353 | B1 * | 2/2019 | Lorenz | H01H 47/02 |
| 2007/0188025 | A1 * | 8/2007 | Keagy | H05B 39/086 307/115 |
| 2008/0106833 | A1 | 5/2008 | Lewinski et al. | |

(Continued)

OTHER PUBLICATIONS

Chinese First Office Action, Application No. 201910857762.6, dated Mar. 25, 2023, pp. 1-11.

*Primary Examiner* — Scott Bauer
(74) *Attorney, Agent, or Firm* — Bond, Schoeneck & King, PLLC

(57) ABSTRACT

The present disclosure is directed to systems and methods for operating a three-way switch. The system includes a user input. The system further includes a relay electrically coupled to a first traveler wire, a second traveler wire, and a LINE conductor, wherein the relay has a first position and a second position. The relay may be initially set to the first position. The system further includes a toroid having an aperture, wherein a sensing conductor passes through the aperture to generate a sensing voltage. The system further includes a controller configured to toggle the relay from the first position to the second position when (1) the user input is in the on-setting and he sensing voltage is less than a threshold value or (2) the user input is in the off-setting and the sensing voltage is greater than the threshold value.

26 Claims, 11 Drawing Sheets

(56) References Cited

U.S. PATENT DOCUMENTS

| | | | | |
|---|---|---|---|---|
| 2010/0278537 | A1* | 11/2010 | Elberbaum ............ | G08C 23/06 398/112 |
| 2011/0032070 | A1 | 2/2011 | Bleile | |
| 2011/0141647 | A1 | 6/2011 | Garcia et al. | |

* cited by examiner

WI-FI OR WIRED THREE-WAY SWITCH

CROSS-REFERENCE TO RELATED APPLICATIONS

This application is a continuation of U.S. patent application Ser. No. 16/566,420 filed on Sep. 10, 2019 (now U.S. Pat. No. 11,538,646) which claims the benefit of U.S. Provisional Patent Application No. 62/729,211, filed on Sep. 10, 2018, incorporated by reference in its entirety herein. This application also relates to US Pat. App. Pub. No. 20190195932, filed on Sep. 27, 2018, which is owned by Applicant and is incorporated by reference in its entirety herein.

FIELD OF INVENTION

The present disclosure is directed to systems and methods for operating a Wi-Fi enabled three-way switch.

BACKGROUND

In a traditional three-way switch configuration, power to a device or outlet (such as a light bulb) is controlled by two independent switches. Each switch has three terminals, one for a first traveler wire, one for a second traveler wire, and one for a common line. The two travelers electrically connect the terminals of the switches to each other. Each switch also has two settings, such as UP and DOWN, which collaboratively control an ON or OFF state of the device or outlet. However, simply toggling one of the switches to an UP-setting is not enough to provide power to the device. Rather, the other switch must also be properly oriented, according to the internal configuration of the switches and the connection of the travelers. For example, the combination of switch 1 UP and switch 2 DOWN or switch 1 DOWN and switch 2 UP may provide power to the connected device. Conversely, the combinations of switch 1 UP and switch 2 UP or switch 1 DOWN and switch 2 DOWN may turn off power to the connected device.

Accordingly, current Wi-Fi enabled three-way switches require communication with a second Wi-Fi enabled switch disposed at the other end of the travelers to determine the necessary orientation to power on a connected device. As shown above, whether or not a three-way switch enables power to an outlet or device will be dependent on the orientation of the other switch(s) in the system. Current Wi-Fi enabled switches thus require that the other switches report their orientation to each other so that each switch can assume the proper orientation in order to deliver or deny power to an outlet or device. This, however, requires that each switch be Wi-Fi enabled, or at least be configured to communicate with the remaining switches in the system, preventing the use of a traditional mechanical switch within the system, as a switch must be enabled to communicate with every other given switch to know the status of the system.

Accordingly, there is a need in the art for a Wi-Fi switch that can determine its own correct orientation to deliver or deny power to an outlet or device without requiring communication from each switch in the system.

SUMMARY OF THE INVENTION

The present disclosure is directed to systems and methods for operating a Wi-Fi enabled three-way switch. In particular, an embodiment of the present invention is directed to switching a relay of a three-way switch after determining whether the circuit is currently on or off based on measuring the current of the LINE conductor or NEUTRAL conductor.

Generally, in one aspect, a system for operating a three-way switch is provided. The system includes a user input having an on-setting and an off-setting. The system further includes a relay electrically coupled to a first traveler wire, a second traveler wire, and a LINE conductor, wherein the relay has a first position and a second position. The relay may be initially set to the first position. The system further includes a toroid having an aperture, wherein a sensing conductor passes through the aperture to generate a sensing voltage. The system further includes a controller configured to toggle the relay from the first position to the second position when (1) the user input is in the on-setting and the sensing voltage is less than a threshold value or (2) the user input is in the off-setting and the sensing voltage is greater than the threshold value. The sensing conductor may be the LINE conductor. The sensing conductor may be a NEUTRAL conductor.

According to an embodiment, the system may further include an amplifier circuit configured to amplify the sensing voltage.

According to an embodiment, the system may further include a rectifier circuit configured to provide power to the controller via the LINE conductor. The rectifier circuit may be a half wave rectifier. The rectifier circuit may be a full wave rectifier.

According to an embodiment, the system may further include a rectifier circuit configured to provide power to the controller via the first traveler wire. The rectifier circuit may be a half wave rectifier. The rectifier circuit may be a full wave rectifier.

According to an embodiment, the system may further include a rectifier circuit configured to provide power to the controller via the second traveler wire. The rectifier circuit may be a half wave rectifier. The rectifier circuit may be a full wave rectifier.

According to an embodiment, the system may further include a zero cross circuit configured to provide a zero cross signal to the controller via the LINE conductor.

According to an embodiment, the system may further include a zero cross circuit configured to provide a zero cross signal to the controller via the first traveler wire.

According to an embodiment, the system may further include a zero cross circuit configured to provide a zero cross signal to the controller via the second traveler wire.

Generally, in another aspect, a method for operating a three-way switch is provided. The method includes the step of providing a user input having an on-setting and an off-setting. The method further includes the step of providing a relay electrically coupled to a first traveler wire, a second traveler wire, and a LINE conductor, wherein the relay has a first position and a second position. The relay may be initially set to the first position. The method further includes the step of generating, via a toroid, a sensing voltage from a sensing conductor passing through an aperture of the toroid. The method further includes the step of toggling, via a controller, the relay from the first position to the second position when (1) the user input is in the on-setting and the sensing voltage is less than a threshold value or (2) the user input is in the off-setting and the sensing voltage is greater than the threshold value. The sensing conductor may be the LINE conductor. The sensing conductor may be a NEUTRAL conductor. According to an embodiment, the method may further include the step of amplifying, via an amplifier circuit, the sensing voltage.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

The present disclosure is directed to systems and methods for operating a Wi-Fi enabled three-way switch. However, this technique is applicable to all forms and protocols of wireless control including, but not limited to, Bluetooth, Bluetooth Low Energy (BLE) enabled, Thread, and Zigbee and the like (as should be appreciated and understood by a person of ordinary skill in the art in conjunction with this disclosure). More generally, Applicant has recognized and appreciated that it is critical for a Wi-Fi enabled switch to be able to determine the orientation (such as on or off) of a second non-Wi-Fi enabled switch, so that the Wi-Fi enabled switch may appropriately enable or disable power to a destination outlet or device.

Figure 1:
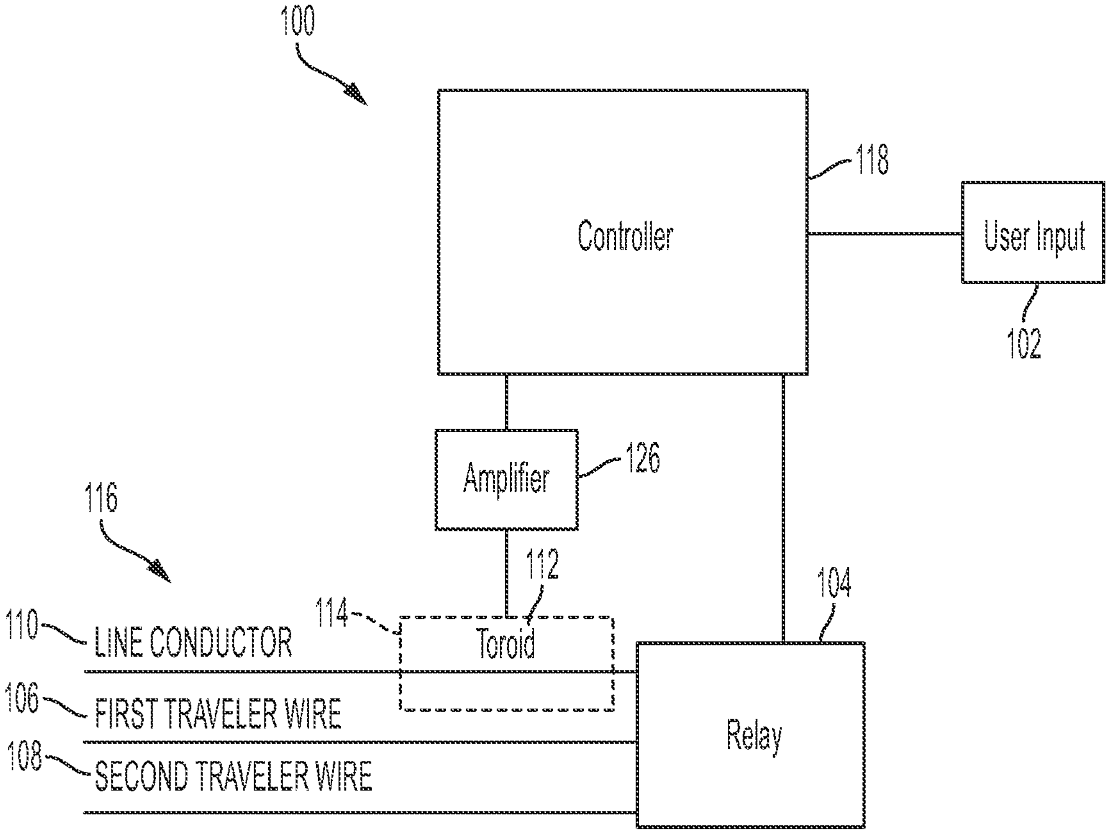
FIG. 1 is a simplified schematic of a system for operating a three-way switch, according to an example.
Figure 2A:
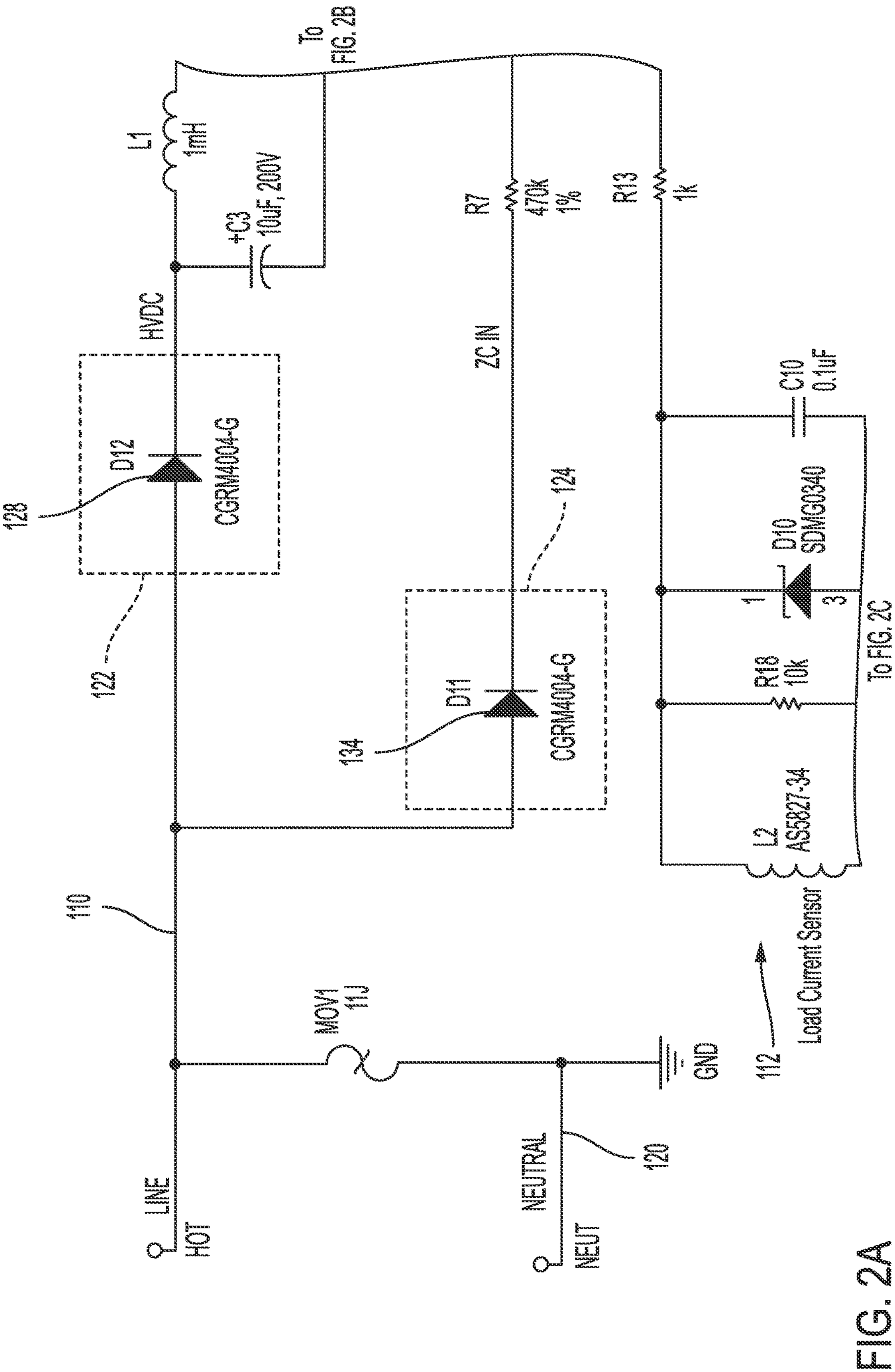
FIG. 2A is a partial view of a more detailed schematic of a system for operating a three-way switch, according to an example, and is best understood in combination with FIG. 3.
Figure 2B:
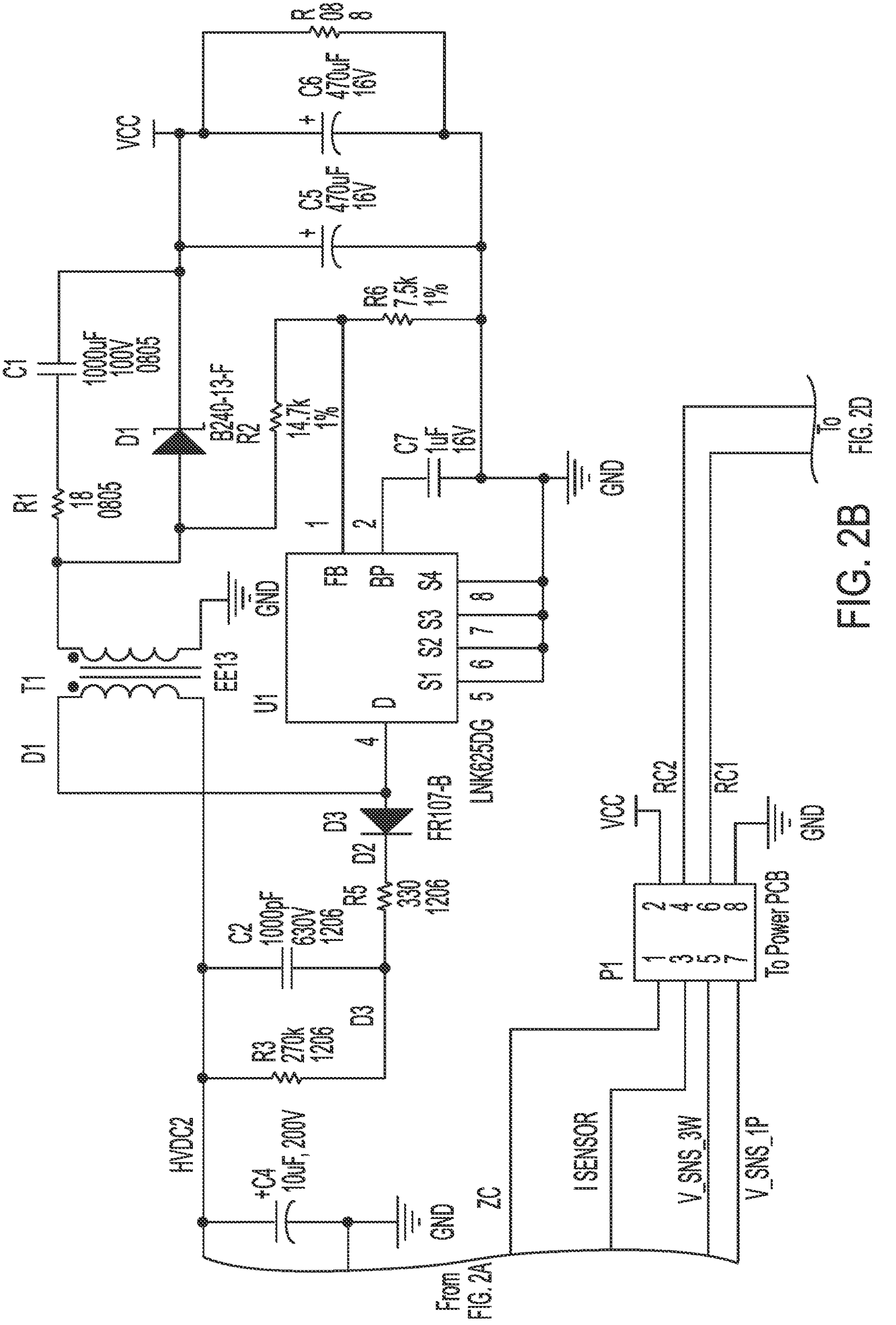
FIG. 2B is a partial view of a more detailed schematic of a system for operating a three-way switch, according to an example, and is best understood in combination with FIG. 3.
Figure 2C:
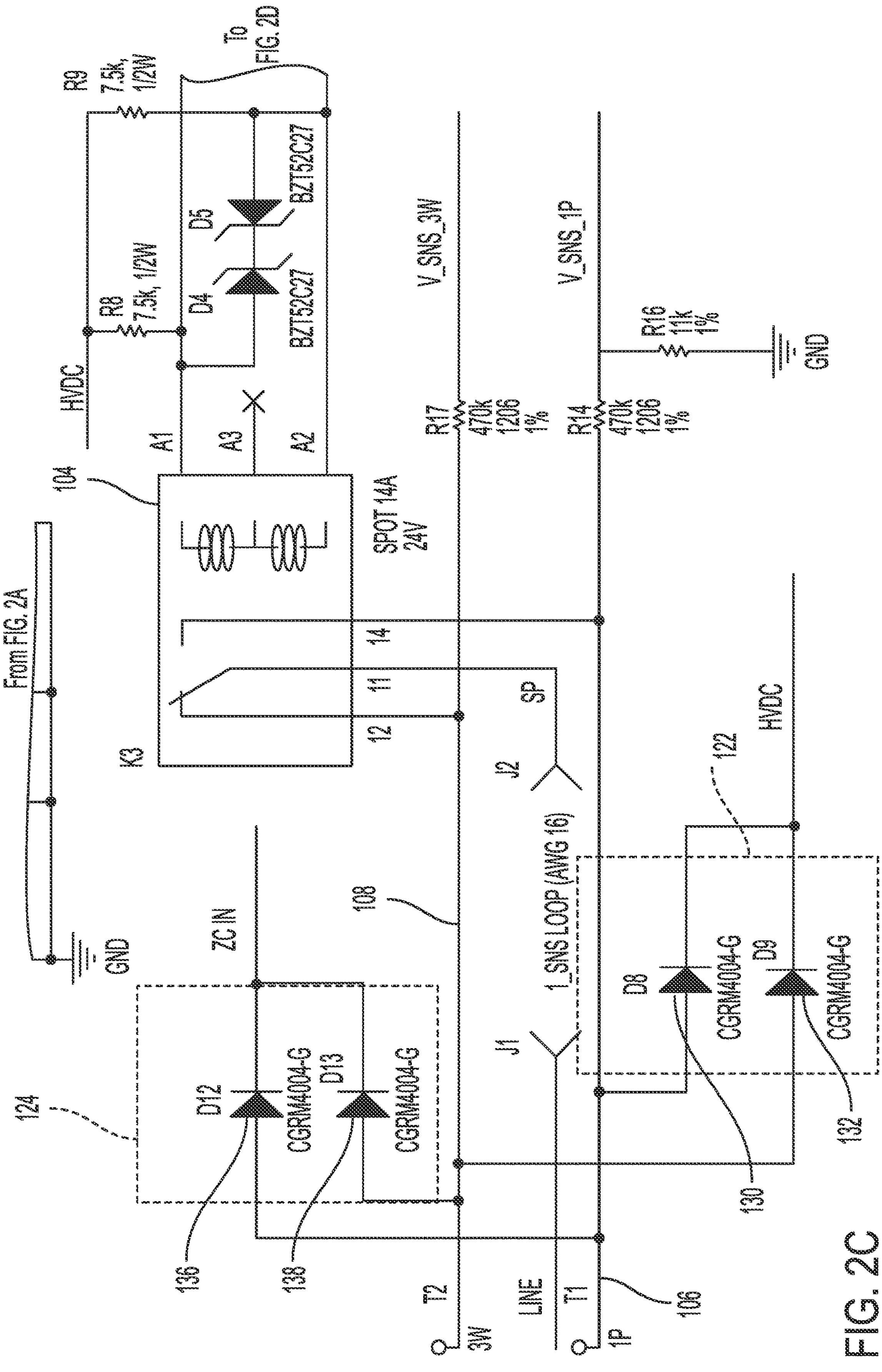
FIG. 2C is a partial view of a more detailed schematic of a system for operating a three-way switch, according to an example, and is best understood in combination with FIG. 3.
Figure 2D:
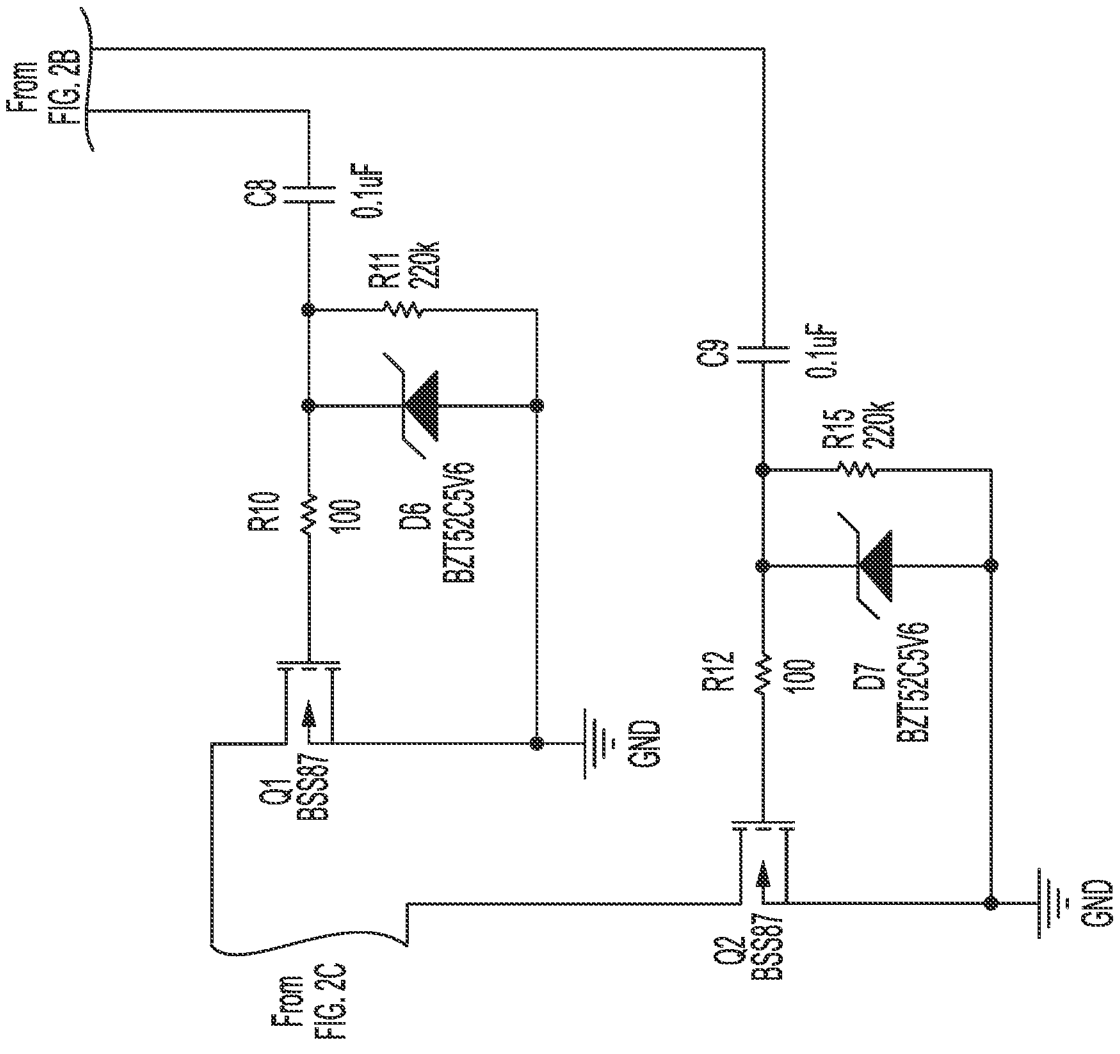
FIG. 2D is a partial view of a more detailed schematic of a system for operating a three-way switch, according to an example, and is best understood in combination with FIG. 3.
Figure 3A:
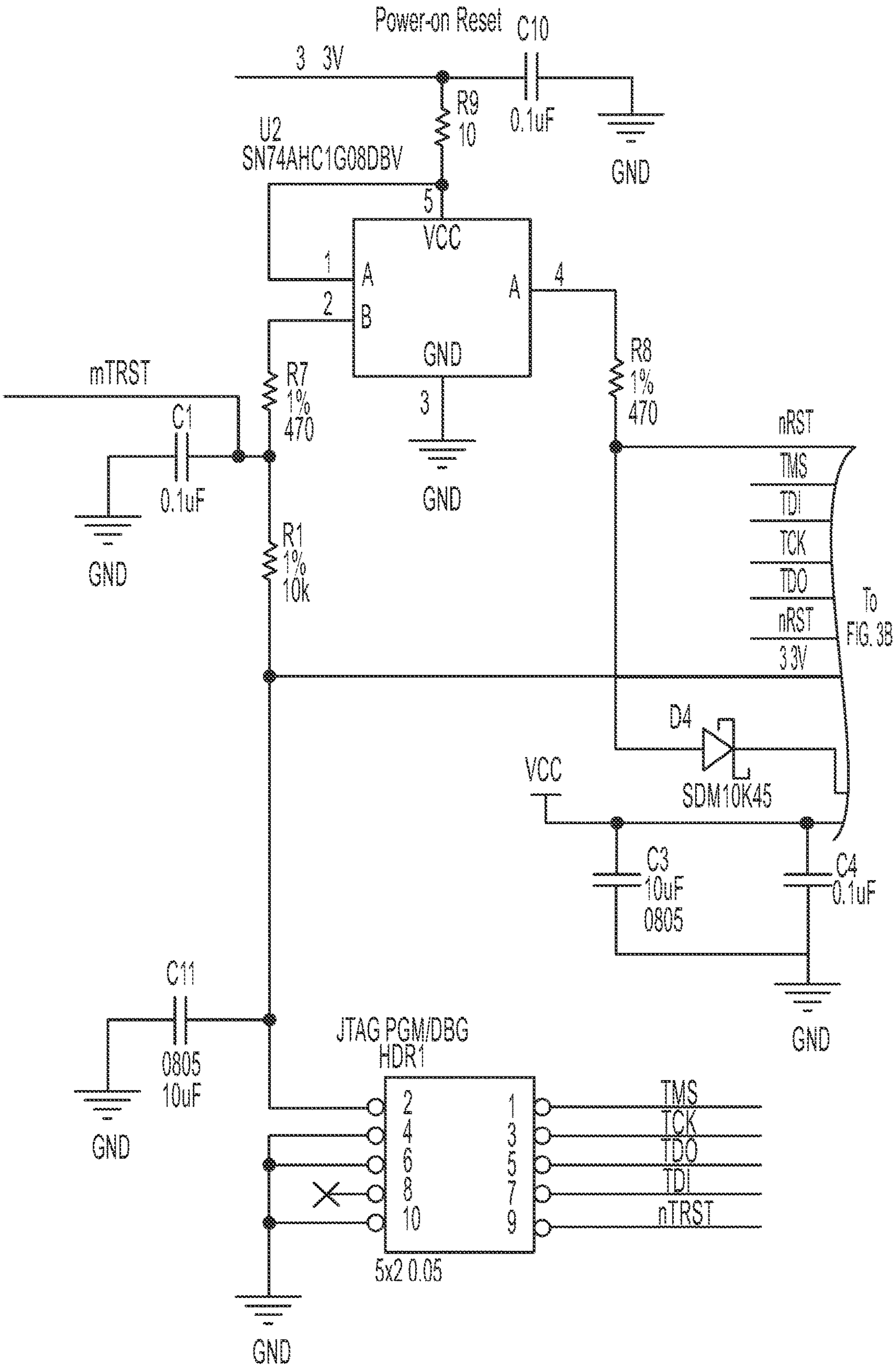
FIG. 3A is a partial view of a more detailed schematic of a system for operating a three-way switch, according to an example, and is best understood in combination with FIG. 2.
Figure 3B:
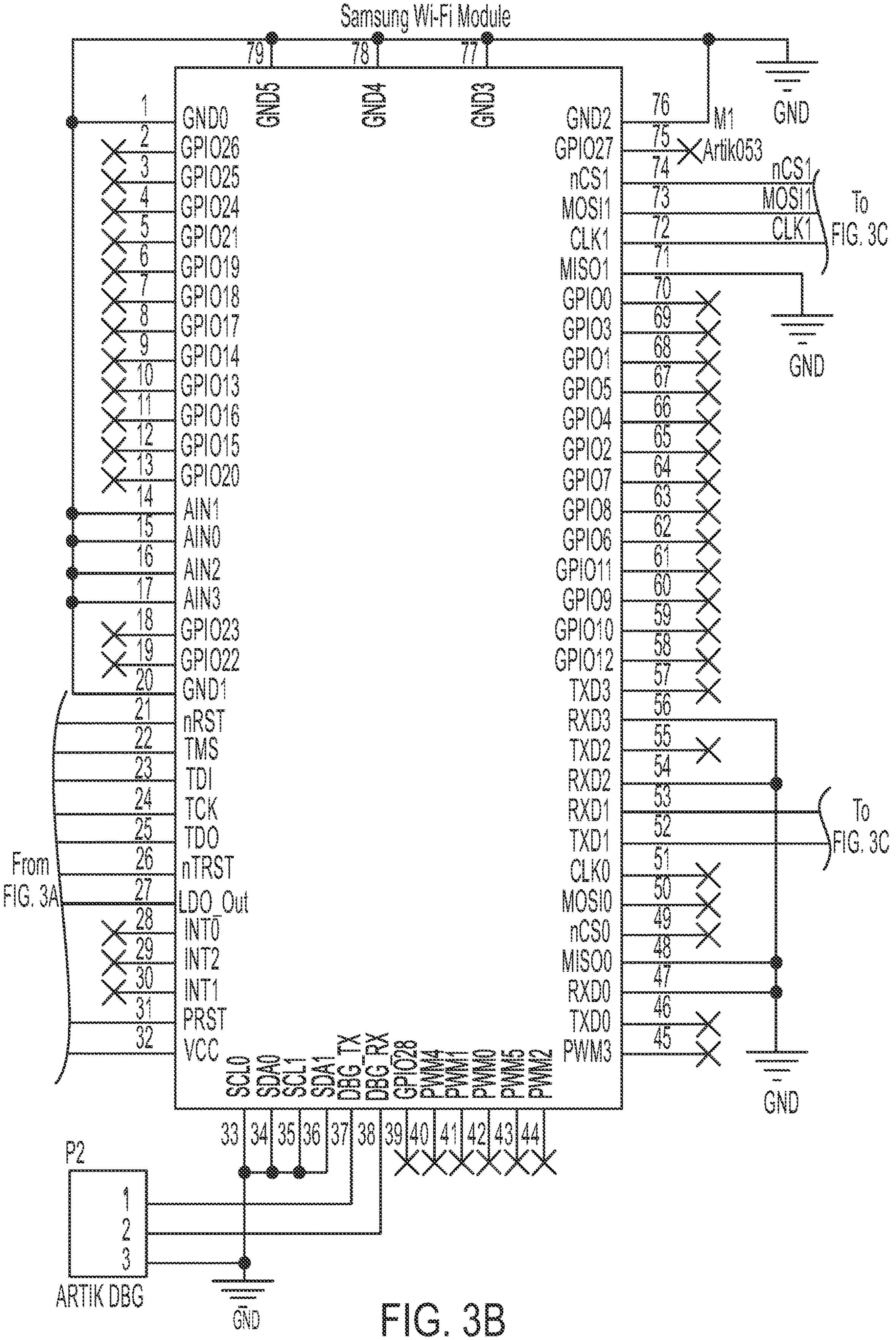
FIG. 3B is a more detailed schematic of a system for operating a three-way switch, according to an example, and is best understood in combination with FIG. 2.
Figure 3C:
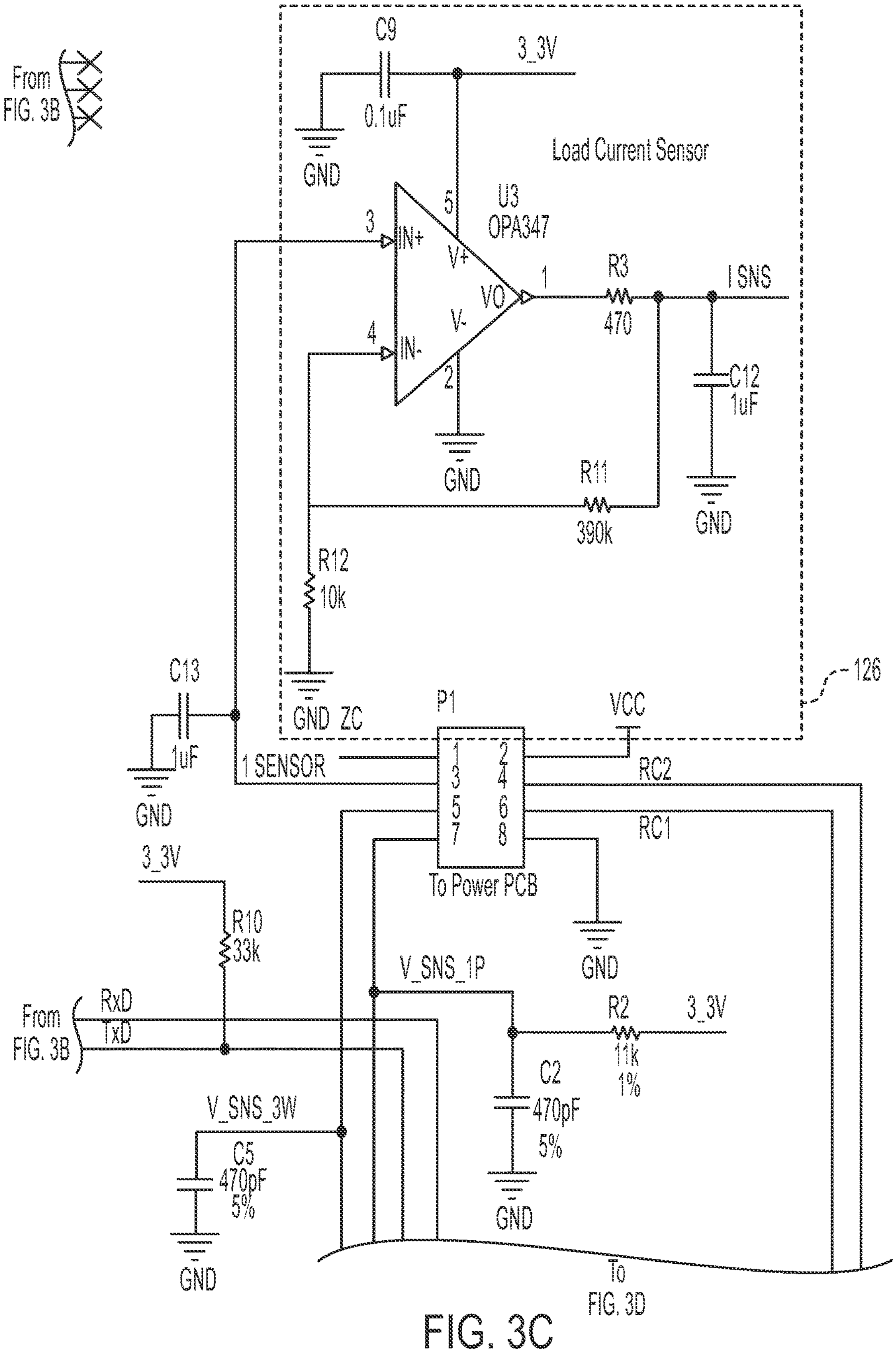
FIG. 3C is a more detailed schematic of a system for operating a three-way switch, according to an example, and is best understood in combination with FIG. 2.
Figure 3D:
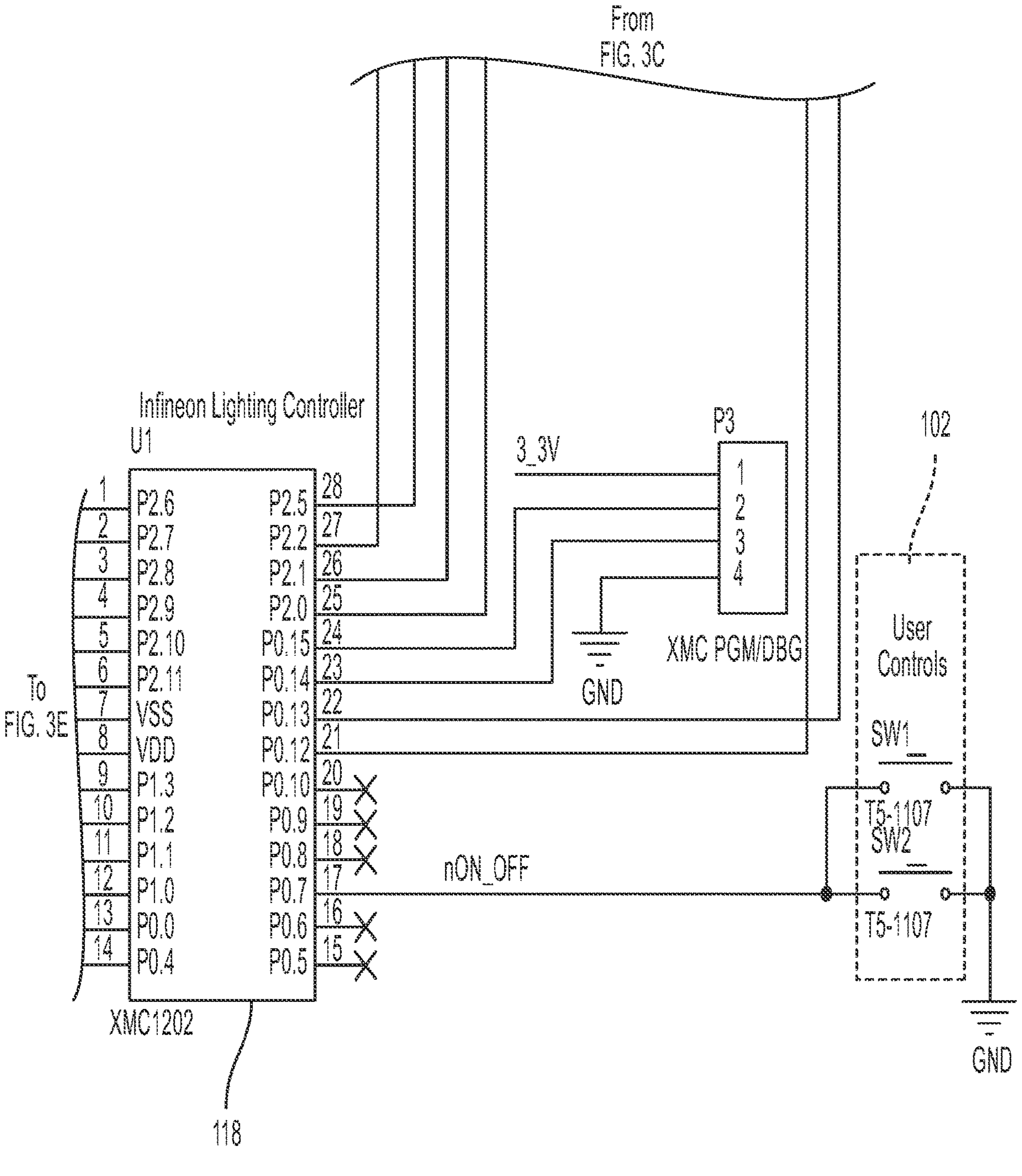
FIG. 3D is a more detailed schematic of a system for operating a three-way switch, according to an example, and is best understood in combination with FIG. 2.
Figure 3E:
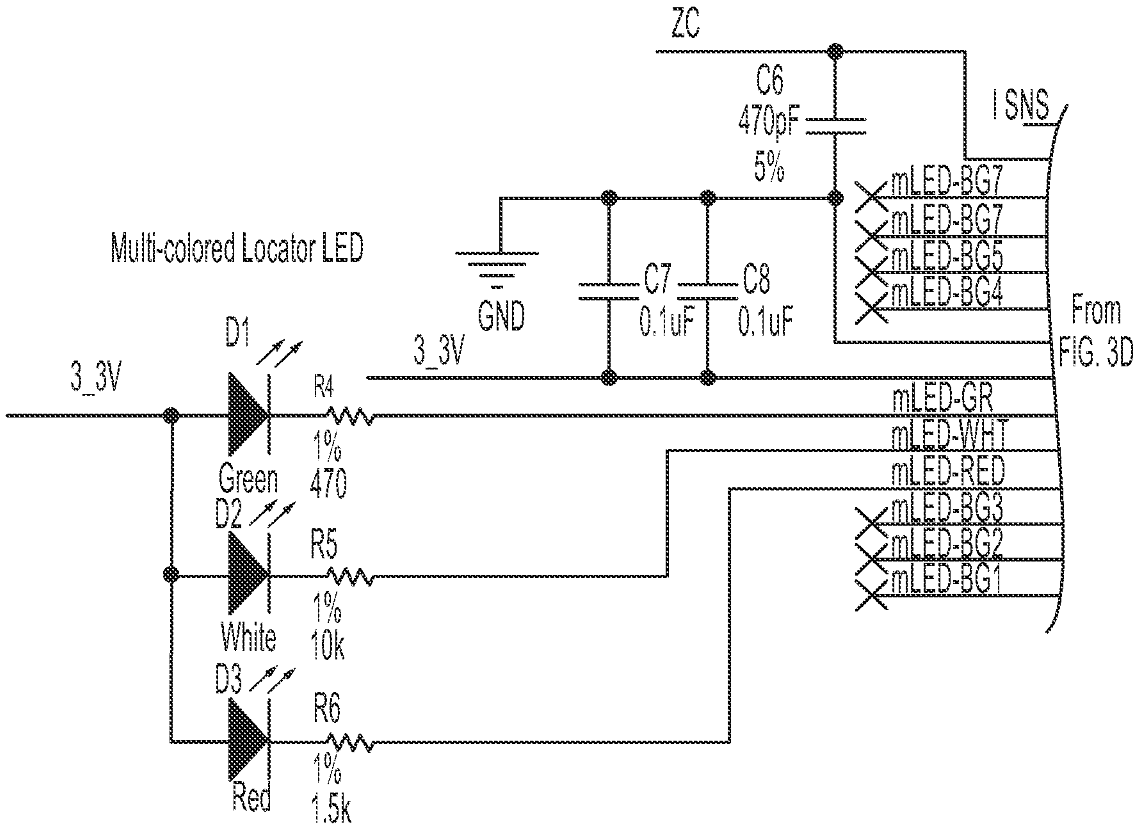
FIG. 3E is a more detailed schematic of a system for operating a three-way switch, according to an example, and is best understood in combination with FIG. 2.

In one aspect, and with reference to FIGS. 1-3, a system 100 for operating a three-way switch is provided. The system includes a user input 102 having an on-setting and an off-setting. The user input 102 may be a mechanical switch. The user input 102 may be electrically coupled to controller 118. It should be appreciated that the user input 102 may be any appropriate type of switch or interface configured to convey a user input signal to controller 118.

The system 100 further includes a relay 104 electrically coupled to a first traveler wire 106, a second traveler wire 108, and a LINE conductor 110, wherein the relay 104 has a first position and a second position. Relay 104 may be initially set to the first position. The first and second positions of the relay 104 do not necessarily directly correspond (but could) to the on/off-settings/commands of the user input 102. The on-setting/command of the user input 102 does not necessarily (but could) require the relay 104 to be in the first position. Additionally, the first position is not necessarily (but could be) a default position for relay 104.

The system 100 further includes a toroid 112 having an aperture 114, wherein a sensing conductor 116 passes through the aperture 114 to generate a sensing voltage. The sensing conductor 116 may be the LINE conductor 110. The sensing conductor may be a NEUTRAL conductor 120.

The system 100 further includes a controller 118 configured to toggle the relay 104 from the first position to the second position when (1) the user input 102 is in the on-setting and the sensing voltage is less than a threshold value or (2) the user input 102 is in the off-setting and the sensing voltage is greater than the threshold value.

The system may further include an amplifier circuit 126 configured to amplify the sensing voltage. The amplifier circuit may be a non-inverting amplifier circuit formed with an operational amplifier. It should be appreciated than any appropriate amplifier circuit or circuits may be used to amplify to the sensing voltage such that it may be read by the controller 118.

The system 100 is configured to determine the correct orientation of a Wi-Fi enabled switch without requiring a report (via Wi-Fi or other means) from each switch in the system. Such a Wi-Fi enabled switch may be used in a three-way configuration such as shown in FIGS. 1A and 1B of U.S. Pat. No. 9,996,096, herein incorporated by reference in its entirety. As shown, the system determines the correct orientation of the switch by monitoring the current flowing through relay 104. For example, if the Wi-Fi enabled switch is connected, by way of the first and second traveler wires 106, 108, to a mechanical switch, and the Wi-Fi enabled switch receives an ON command (i.e., a command to turn an outlet or device, connected to the three-way switch on) the Wi-Fi enabled three-way switch will determine whether current is currently flowing through relay 104. The ON command may be received from the cloud, from an app, the switch itself, or any other appropriate means. If current is flowing through relay 104, that means that both the Wi-Fi enabled three way switch and the switch to which it is connected are in the correct orientation to deliver power to the outlet or device, and no change is required. Conversely, if no current is flowing through relay 104, that means that the Wi-Fi switch and the switch to which it is connected is not in the correct orientation to deliver power to the outlet or device and the Wi-Fi switch must toggle relay 104 in order to deliver power. The same concept applies if the Wi-Fi enabled switch receives an OFF command—it will change orientation only if it determines that current is presently flowing.

In order to determine whether current is flowing to the destination device or outlet, the Wi-Fi enabled switch may use a toroid 112 having an aperture 114 through which sensing conductor 116 (one of either the LINE conductor 110 or NEUTRAL conductor 120) passes. Current passing through either conductor will create a sensing voltage across the toroid 112. It should, however, be understood that other methods of determining whether current is flowing, such as using a shunt resistor, may be used.

In the embodiment shown in FIGS. 1-3, the sensing voltage across the toroid 112 is amplified by amplifier circuit 126, and is subsequently input to controller 118 for interpretation. Controller 118 is configured to receive the ON/OFF command from user input 102. Controller 118 is also configured to interpret the sensing voltage across the toroid 112 in order to determine whether relay 104 should be toggled to the other traveler wire (first traveler wire 106 or second traveler wire 108) or should remain on the same traveler. If controller 118 determines that no power is flowing after receiving an ON command, controller 118 will toggle relay 104. If, however, controller 118 determines that power is flowing, it will take no action. Similarly, if controller 118 determines that no power is flowing after receiving an OFF command, controller 118 will take no action. However, if controller 118 determines that power is flowing, it will toggle relay 104. It should be understood that, instead of using a processor as presently disclosed, controller 118 may be implemented with a combination of processors or with a dedicated circuit.

According to an embodiment, the system 100 may further include a rectifier circuit 122 configured to provide power to the controller via the LINE conductor 110. The rectifier circuit 122 may be a half wave rectifier. The rectifier circuit 122 may be a full wave rectifier.

According to an embodiment, the system 100 may further include a rectifier circuit 122 configured to provide power to the controller via the first traveler wire 106. The rectifier circuit 122 may be a half wave rectifier. The rectifier circuit 122 may be a full wave rectifier.

According to an embodiment, the system 100 may further include a rectifier circuit 122 configured to provide power to the controller via the second traveler wire 108. The rectifier circuit 122 may be a half wave rectifier. The rectifier circuit 122 may be a full wave rectifier.

Depending on where in the system a Wi-Fi enabled three-way switch is placed, the controller 118 (or other components) may receive power from LINE conductor 110, or from either the first or second traveler wire 106, 108. In order to avoid requiring different installations, and depending on the placement of the Wi-Fi enabled switch, the Wi-Fi enabled switch may be configured to receive power from LINE conductor 110, and/or from either the first or second traveler wire 106, 108. This may be accomplished, for example, by attaching a respective rectifier 122 (either half wave or full wave) to LINE conductor 110, and to each of the first or second traveler wire 106, 108. Thus, regardless of which of conductor or traveler is currently powered, the Wi-Fi enabled switch will always receive the necessary power through one of the respective rectifiers.

As shown in the example schematic of FIG. 2, diodes 128, 130, and 132 perform this function. Diode 128 is positioned to rectify power from the LINE conductor 110 when Wi-Fi enabled three-way switch is placed to receive power from LINE conductor 110. And similarly, Wi-Fi enabled three-way switch is configured to receive a rectified power signal from one of diode 130 or 132 when placed to receive power from the first or second traveler wires 106, 108 (depending on which traveler wire is currently receiving power).

According to an embodiment, the system 100 may further include a zero cross circuit 124 configured to provide a zero cross signal to the controller 118 via the LINE conductor 110.

According to an embodiment, the system 100 may further include a zero cross circuit 124 configured to provide a zero cross signal to the controller 118 via the first traveler wire 106.

According to an embodiment, the system may further include a zero cross circuit configured to provide a zero cross signal to the controller via the second traveler wire 108.

Where controller 118 requires a zero cross input, the zero cross input may be input from a zero cross circuit formed by one of diodes 134, 136, or 138, depending on the placement of Wi-Fi enabled switch and whether LINE conductor 110 or one of the travelers 106, 108 is currently receiving power.

Figure 4:
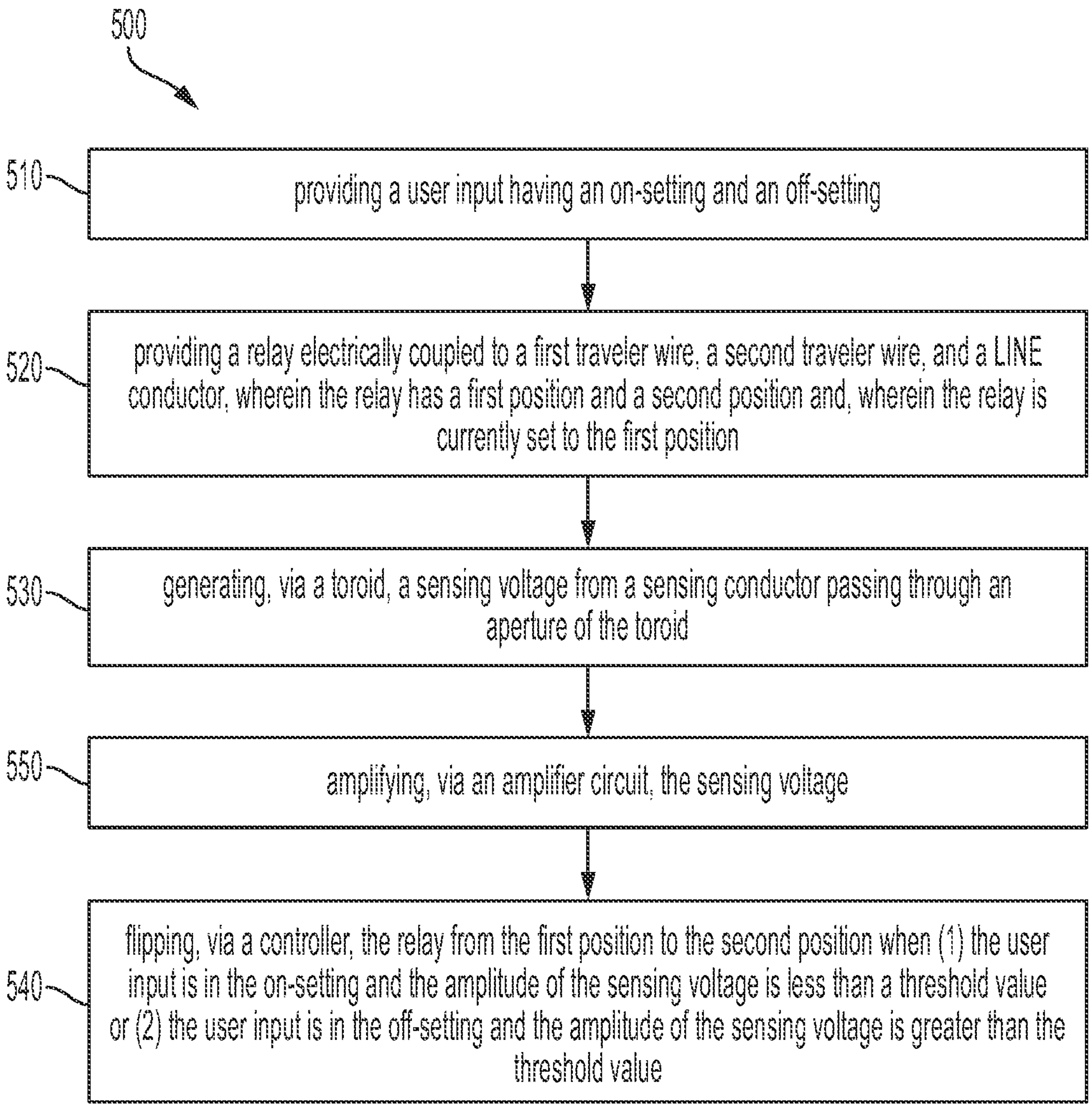
FIG. 4 is a flowchart of a method for operating a three-way switch, according to an example.

Generally, in another aspect, and with reference to FIG. 4, a method for operating a three-way switch is provided. The method includes the step of providing a user input having an on-setting and an off-setting. The method further includes the step of providing a relay electrically coupled to a first traveler wire, a second traveler wire, and a LINE conductor, wherein the relay has a first position and a second position. The relay may be initially set to the first position. The method further includes the step of generating, via a toroid, a sensing voltage from a sensing conductor passing through an aperture of the toroid. The method further includes the step of toggling, via a controller, the relay from the first position to the second position when (1) the user input is in the on-setting and the sensing voltage is less than a threshold value or (2) the user input is in the off-setting and the sensing voltage is greater than the threshold value. The sensing conductor may be the LINE conductor. The sensing conductor may be a NEUTRAL conductor. According to an embodiment, the method may further include the step of amplifying, via an amplifier circuit, the sensing voltage.

Although the above-description relates to three-way switches, it should be appreciated that it may be extended to systems and methods relating to any number of switches, such as four-way switches and other systems utilizing multiple switches.

By utilizing the Wi-Fi feature of the present disclosure, the system may exercise Internet of Things (IoT) capabilities. Further, the system could function similarly to a multi-location-type system.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

All references, including publications, patent applications, and patents, cited herein are hereby incorporated by reference to the same extent as if each reference were individually and specifically indicated to be incorporated by reference and were set forth in its entirety herein.

All definitions, as defined and used herein, should be understood to control over dictionary definitions, definitions in documents incorporated by reference, and/or ordinary meanings of the defined terms.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Approximating language, as used herein throughout the specification and claims, may be applied to modify any quantitative representation that could permissibly vary without resulting in a change in the basic function to which it is related. Accordingly, a value modified by a term or terms, such as "about" and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any nonclaimed element as essential to the practice of the invention.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

The invention claimed is:

1. A system for operating a three-way switch, comprising:

a user input having an on-setting and an off-setting;

a relay electrically coupled to a first traveler wire, a second traveler wire, and a LINE conductor, wherein the relay has a first position and a second position;

a sensor generating a sensing voltage representing a magnitude of a current passing through a sensing conductor, wherein the sensing conductor is one of the LINE conductor or a NEUTRAL conductor; and a controller configured to toggle the relay from the first position to the second position when (1) the user input is placed in the on-setting and the sensing voltage is less than a threshold value or (2) the user input is placed in the off-setting and the sensing voltage is greater than the threshold value.

2. The system of claim 1, wherein the relay is initially set to the first position.

3. The system of claim 1, wherein the sensing conductor is the LINE conductor.

4. The system of claim 1, wherein the sensing conductor is the NEUTRAL conductor.

5. The system of claim 1, further comprising an amplifier circuit configured to amplify the sensing voltage.

6. The system of claim 1, further comprising a rectifier circuit configured to provide power to the controller via the LINE conductor.

7. The system of claim 6, wherein the rectifier circuit is a half wave rectifier.

8. The system of claim 6, wherein the rectifier circuit is a full wave rectifier.

9. The system of claim 1, further comprising a rectifier circuit configured to provide power to the controller via the first traveler wire.

10. The system of claim 9, wherein the rectifier circuit is a half wave rectifier.

11. The system of claim 9, wherein the rectifier circuit is a full wave rectifier.

12. The system of claim 1, further comprising a rectifier circuit configured to provide power to the controller via the second traveler wire.

13. The system of claim 12, wherein the rectifier circuit is a half wave rectifier.

14. The system of claim 12, wherein the rectifier circuit is a full wave rectifier.

15. The system of claim 1, further comprising a zero cross circuit configured to provide a zero cross signal to the controller via the LINE conductor.

16. The system of claim 1, further comprising a zero cross circuit configured to provide a zero cross signal to the controller via the first traveler wire.

17. The system of claim 1, further comprising a zero cross circuit configured to provide a zero cross signal to the controller via the second traveler wire.

18. The system of claim 1, wherein the relay is initially set to the second position.

19. The system of claim 1, wherein the controller configured to toggle the relay from the second position to the first position when (1) the user input is placed in the off-setting and the sensing voltage is greater than a threshold value, or (2) the user input is placed in the on-setting and the sensing voltage is less than the threshold value.

20. A method for operating a three-way switch, comprising the steps of:

providing a user input having an on-setting and an off-setting;

providing a relay electrically coupled to a first traveler wire, a second traveler wire, and a LINE conductor, wherein the relay has a first position and a second position;

generating, via a sensor, a sensing voltage from a sensing conductor; and toggling, via a controller, the relay from the first position to the second position when (1) the user input is placed in the on-setting and the sensing voltage is less than a threshold value or (2) the user input is placed in the off-setting and the sensing voltage is greater than the threshold value.

21. The method of claim 20, wherein the sensing conductor is the LINE conductor.

22. The method of claim 20, wherein the sensing conductor is a NEUTRAL conductor.

23. The method of claim 20, further comprising the step of amplifying, via an amplifier circuit, the sensing voltage.

24. The method of claim 20, wherein the relay is initially set to the second position.

25. The method of claim 20, further comprising, toggling relay from the second position to the first position when (1) the user input is placed in the off-setting and the sensing voltage is greater than a threshold value, or (2) the user input is placed in the on-setting and the sensing voltage is less than the threshold value.

26. The method of claim 20, wherein the relay is initially set to the first position.

* * * * *